Aug. 31, 1948. H. STOCK Re. 23,035
SUCTION NOZZLE
Original Filed Jan. 13, 1944 3 Sheets-Sheet 1
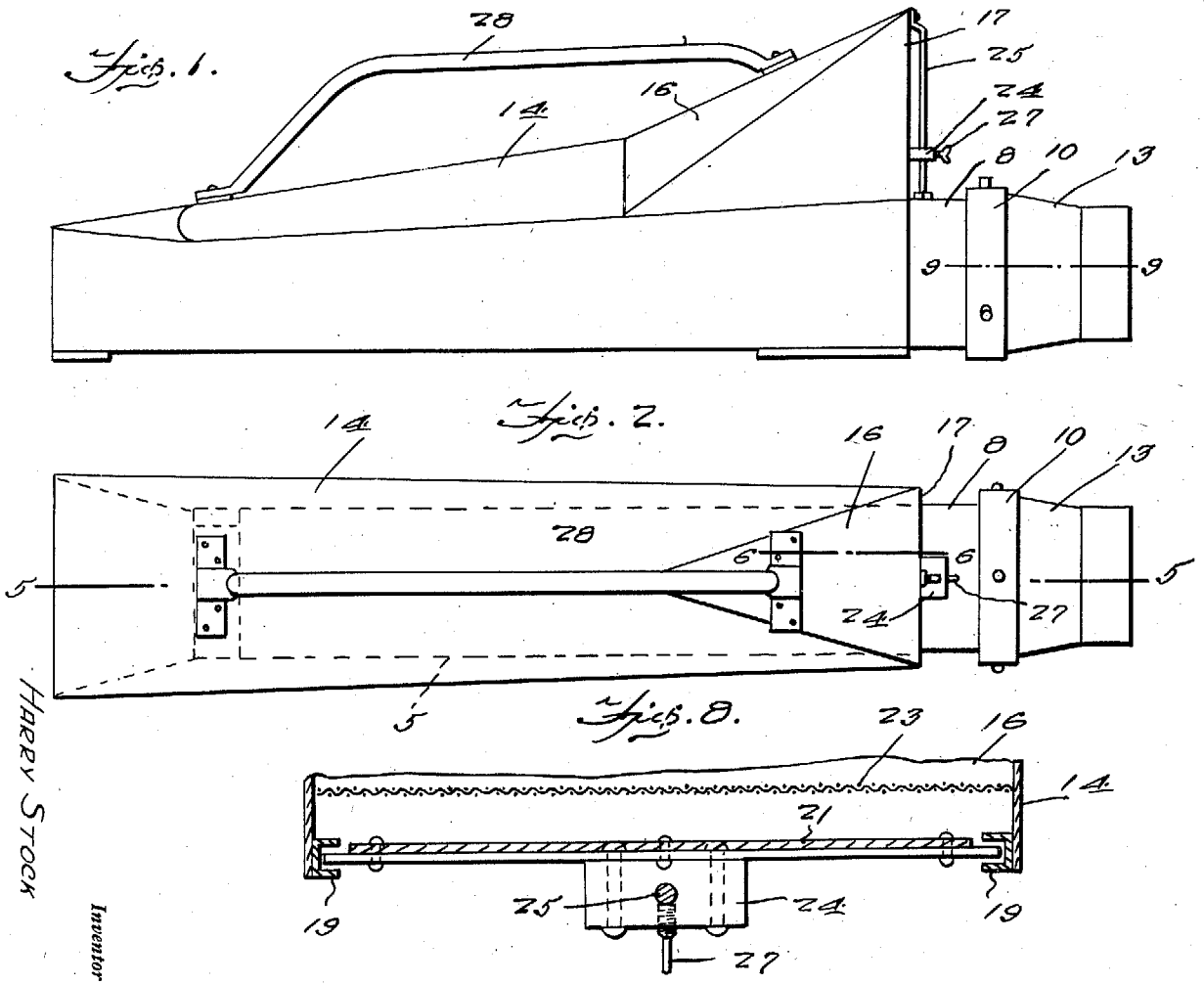
Inventor
HARRY STOCK
By Clarence A. O'Brien and Harvey B. Jacobson
Attorneys

SUCTION NOZZLE

Original Filed Jan. 13, 1944 3 Sheets-Sheet 2

Inventor

HARRY STOCK

By Clarence A. O'Brien and Harvey B. Jacobson

Attorneys

Aug. 31, 1948. H. STOCK Re. 23,035
SUCTION NOZZLE
Original Filed Jan. 13, 1944 3 Sheets-Sheet 3
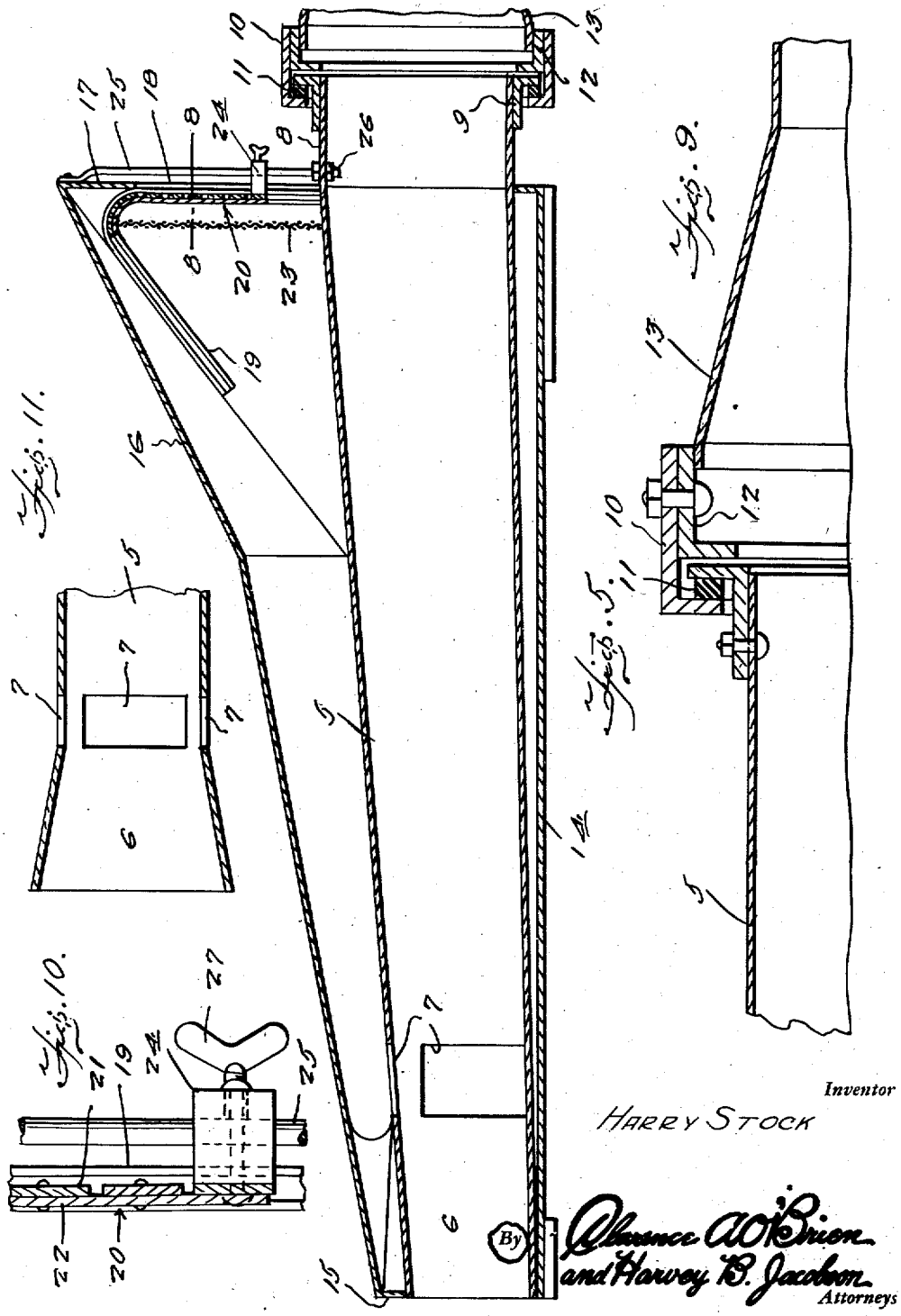
Inventor
HARRY STOCK
By Clarence A. O'Brien and Harvey B. Jacobson
Attorneys Reissued Aug. 31, 1948

Re. 23,035

UNITED STATES PATENT OFFICE 23,035

SUCTION NOZZLE

Harry Stock, Minneapolis, Minn.

Original No. 2,419,740, dated April 29, 1947, Serial No. 518,153, January 13, 1944. Application for reissue October 28, 1947, Serial No. 782,470

2 Claims. (Cl. 302—58)

This invention relates to new and useful improvements in suction apparatus and more particularly to a nozzle for use in loading, unloading and transferring various granular material or material of a pulverized nature such as chemicals.

An important object of the present invention is to provide a suction nozzle constructed in such a manner as to be more positive acting in its suction operation on materials than nozzles heretofore used.

Another important object of the invention is to provide an air inlet for suction nozzles which can be easily controlled by the operator.

Other objects and advantages of the invention will become apparent to the reader of the following description.

In the drawings:

Figure 1 is a side elevational view of the nozzle.

Figure 2 is a top plan view.

Figure 5 is an enlarged fragmentary detailed sectional view taken substantially on the line 5—5 of Figure 2.

Figure 8 is a fragmentary sectional view taken substanstially on the line 8—8 of Figure 5.

Figure 9 is a fragmentary detailed sectional view taken substantially on the line 9—9 of Figure 1.

Figure 10 is a fragmentary detailed sectional view taken substantially on the line 10—10 of Figure 4.

Figure 11 is a fragmentary detailed sectional view through the suction tube.

Figure 6:
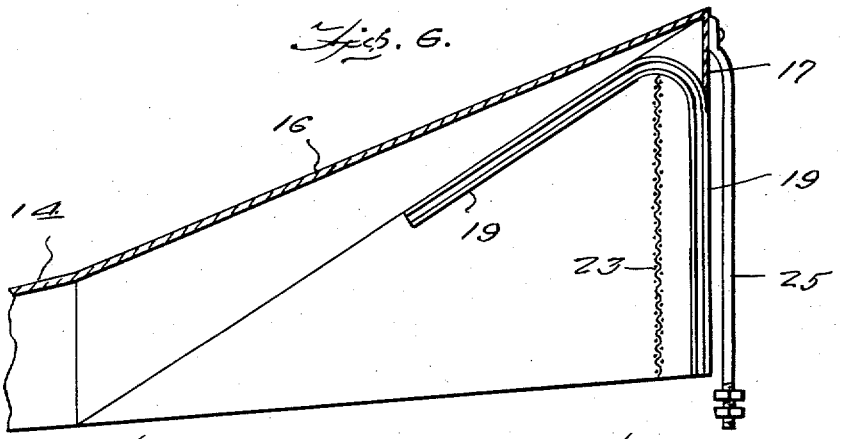
Figure 6 is a fragmentary detailed sectional view taken substantially on the line 6—6 of Figure 2.
Figure 3:
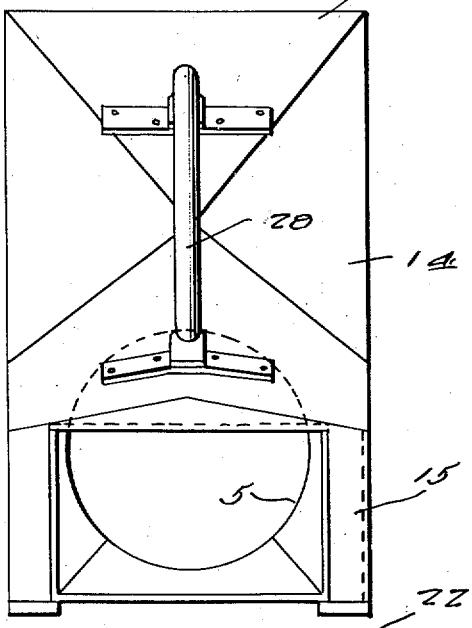
Figure 3 is a front end elevational view.
Figure 4:
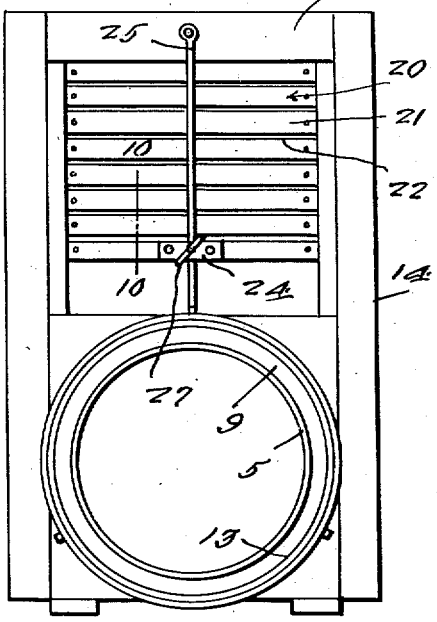
Figure 4 is a rear end elevational view.
Figure 7:
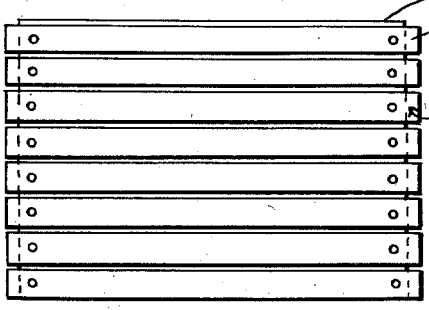
Figure 7 is an elevational view of the shutter air regulator.

Referring to the drawings wherein like numerals designate like parts, it can be seen that numeral 5 denotes an elongated suction tube slightly flared at its inlet end as at 6. Adjacent this flared end 6, the tube 5 is provided with rectangular-shaped air inlet openings 7.

The tube 5 has a short cylindrical extension 8 at its hose attaching end, this extension 8 being provided with a flanged collar 9 over which a flanged sleeve 10 is adapted to engage with suitable packing means 11 interposed between the flanged collar 9 and the flanged sleeve 10. The sleeve 10 is suitably secured to a ring 12 on the adjacent end of a conduit or hose 13.

A shell 14 encases the major portion of the suction tube 5, one end being restricted as at 15.

One side of the shell 14 flares outwardly as at 16 to define an air inlet compartment having a rear wall 17. This wall 17 has an air inlet opening 18 and inwardly of this opening and carried by the side walls of the flared portion 16 of the shell are substantially inverted V-shaped channeled guides 19 in which move the side edge portions of a flexible shutter 20, which is made up of a plurality of slats 21 suitably secured to a flexible web 22. Inwardly of the shutter 20 is a foraminous or mesh wall 23.

A boss 24 projects outwardly from the shutter and through the air inlet opening 18 where it is formed with a vertical opening receiving a guide rod 25, the upper end of which is secured to the upper portion of the back wall 17 while the lower end is secured as at 26 detachably to the extension 8 of the suction tube 5. A wing headed screw 27 is feedable into the boss 24 and adapted to bite against the rod 25 to hold the shutter 20 in any desired position in order to regulate the amount of air that is to be admitted to the air compartment and the suction tube 5.

A handle 28 is provided on the shell 14. Obviously, the connection shown in Figure 9 permits a swivelled action between the suction tube 5 and the hose coupling 13 so that the nozzle may be rotated to the extent desired.

While the foregoing specification sets forth the invention in specfiic terms, it is to be understood that numerous changes in the shape, size and materials may be resorted to without departing from the spirit and scope of the invention as claimed hereinafter.

Having described the invention, what is claimed as new is:

1. A suction nozzle comprising a suction tube having an intake end and a discharge end, a shell encasing said tube and having a portion extending along one side of the tube from said intake to said discharge end and flaring toward said discharge end, said portion having an open rear end to provide an air inlet into said portion, air inlet ports in said tube adjacent to the intake end thereof establishing communication with said tube and said shell, a flexible slat shutter for closing said inlet, channel tracks at opposite edges of said shutter and opposite sides of said inlet within said portion and in which said shutter is slidably mounted for adjustment to open and close the inlet, said tracks being longitudinally V-shaped to cause said shutter when opened to assume a position at an acute angle to the plane of said inlet for accommodation in said portion, and means to secure the shutter in different adjusted positions.

2. A suction nozzle comprising a suction tube having a forward receiving end adapted to be inserted into granular material and a rear discharge end, a suction conduit connected to the rear end of said tube, a shell surrounding said tube and running rearwardly from the forward end of said tube, said shell having a regulatable air admission opening in its rear portion, said tube adjacent to but spaced slightly rearwardly from its forward end having a constricted portion therein, and said constricted portion having passages through its wall at three sides thereof communicating with said shell.

HARRY STOCK.

REFERENCES CITED

The following references are of record in the file of this patent:

UNITED STATES PATENTS

| Number | Name | Date |
|---|---|---|
| 646,490 | Deery | Apr. 3, 1900 |
| 1,416,013 | Gieseler | May 16, 1922 |

FOREIGN PATENTS

| Number | Country | Date |
|---|---|---|
| 224,618 | Germany | July 23, 1910 |
| 276,114 | Germany | July 4, 1914 |